(12) United States Patent
Wang

(10) Patent No.: US 7,412,519 B2
(45) Date of Patent: Aug. 12, 2008

(54) AUTHORIZED DOCUMENT USAGE INCLUDING RENDERING A PROTECTED DOCUMENT

(75) Inventor: Xin Wang, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 880 days.

(21) Appl. No.: 09/731,917

(22) Filed: Dec. 8, 2000

(65) Prior Publication Data
US 2002/0073202 A1 Jun. 13, 2002

(51) Int. Cl.
*G06F 15/16* (2006.01)
(52) U.S. Cl. .................... 709/227; 709/226; 709/204; 713/193; 713/156
(58) Field of Classification Search ................ 709/207, 709/225, 226, 204, 224, 227; 713/168, 171, 713/186, 193, 165, 189, 156; 705/40, 51
See application file for complete search history.

(56) References Cited

U.S. PATENT DOCUMENTS

| | | | | |
|---|---|---|---|---|
| 5,473,691 A | * | 12/1995 | Menezes et al. | 713/161 |
| 5,692,048 A | * | 11/1997 | Gormish et al. | 380/246 |
| 5,937,066 A | * | 8/1999 | Gennaro et al. | 380/286 |
| 6,032,260 A | * | 2/2000 | Sasmazel et al. | 726/10 |
| 6,035,398 A | * | 3/2000 | Bjorn | 713/186 |
| 6,119,108 A | * | 9/2000 | Holmes et al. | 705/40 |
| 6,157,618 A | * | 12/2000 | Boss et al. | 370/252 |
| 6,263,432 B1 | * | 7/2001 | Sasmazel et al. | 726/10 |
| 6,301,660 B1 | * | 10/2001 | Benson | 713/165 |
| 6,343,361 B1 | * | 1/2002 | Nendell et al. | 713/171 |
| 6,351,467 B1 | * | 2/2002 | Dillon | 370/432 |
| 6,446,050 B1 | * | 9/2002 | Kondo et al. | 705/51 |
| 6,519,700 B1 | * | 2/2003 | Ram et al. | 713/193 |
| 6,598,161 B1 | * | 7/2003 | Kluttz et al. | 713/166 |
| 6,668,322 B1 | * | 12/2003 | Wood et al. | 713/182 |
| 6,687,822 B1 | * | 2/2004 | Jakobsson | 713/156 |
| 6,785,812 B1 | * | 8/2004 | Botham et al. | 713/168 |
| 6,927,869 B1 | * | 8/2005 | Simpson et al. | 358/1.15 |
| 6,944,770 B2 | * | 9/2005 | Henderson et al. | 713/189 |

* cited by examiner

*Primary Examiner*—William C. Vaughn, Jr.
*Assistant Examiner*—Thanh Tammy Nguyen
(74) *Attorney, Agent, or Firm*—Oliff & Berridge, PLC

(57) ABSTRACT

Access to protected documents is controlled by delegating the decryption from a document source to a document processing device. Interactions between an input device and the document source are provided to generate public and non-commutative proxy keys. The document processing device can use the proxy keys to convert the documents originally encrypted for the owner/publisher/distributor to ones encrypted for the end user. Authorization and usage are combined by invoking a method of trusted rendering of documents. Thus, the proxy conversion and decryption are delayed to a late stage within the document rendering application.

11 Claims, 3 Drawing Sheets

AUTHORIZED DOCUMENT USAGE INCLUDING RENDERING A PROTECTED DOCUMENT

BACKGROUND OF THE INVENTION

1. Field of Invention

This invention is directed to systems and methods for document distribution and usage authorization of protected documents.

2. Description of Related Art

A sender of a document often wants to ensure that unauthorized access to the document is prevented. The senders have endeavored to add security measures to their documents so that the documents are protected during distribution and usage. Accordingly, only authorized end users can access the protected document.

Document distribution and usage authorization for a protected document may include:

1) An end user as a receiver of protected document contents. For authorization and cryptography purposes, the end user possesses an access device which will engage in the authorized usage.

2) A document processing device, which is a general-purpose computing system such as a PC or a workstation. The protected document is stored and a rendering application is run by the document processing device to process the protected document for the end user.

3) A remote authorization device which acts on behalf of the document owner/distributor to document user authentication, usage authorization and to track document usage.

Protected electronic documents may be secured in electronic envelopes, for example. That is, a content owner/distributor may seal a document in an envelope, and may send the envelope to an end user to open. The envelope is "secured" in that only an intended end user can open the envelope with an access key, for example. Access to a protected document is usually controlled via channels to each end user who wants to view, print, extract, or the like, the protected content, namely, a "high bandwidth" content distribution channel and a "low bandwidth" (secure) key distribution channel. Hence, whether or not the end user is authorized to use the protected document is then controlled mainly by whether or not the end user is allowed to receive the envelope, to possess the right access key to open the envelope, or both.

SUMMARY OF THE INVENTION

A sender of the copyrighted or content-sensitive document often wants to ensure that the document is not accessed by an unauthorized party. However, because electronic documents as well as digital keys, protected or not, are simply bit strings, they can be observed, replicated, modified, extracted and redistributed essentially by anyone who has possession of the documents and keys. Accordingly, the end user together with the document processing device has to be trusted not to redistribute the documents to unintended users. Special trusted hardware installed on the document processing device is required where documents are made available in public but are not protected from any usage and modification that are not authorized by the owner/distributor. Without the special trusted hardware, the end user can simply copy the document and its associated key to other users at will.

Document usage may be conditional in many cases. That is, the documents are available to intended end users under certain terms and conditions on user's credentials, the time or date of access, the duration or times of access, usage fees and the like. For example, an end user such as an employee may be entitled to print a limited amount of copies of a document free of charge during a set range of time. Whenever the end user wants to print the document, the end user has be to verified that the end user is an employee, the number of copies already being printed does not the amount limit, and the time is indeed within the set range of time. In this case, simply encrypting the document for protection and providing initially authorized end users with personal keys to decrypt the protected document do not guarantee enforcement of the terms and conditions. Hence, an authorization process is necessary for each usage request from the end user.

Usage authorization may also depend on the history of document usage such as the document state, and system resources such as the system clock. In such a case, additional mechanisms are necessary for tracking the document state in a storage device and for maintaining the system resources. However, keeping the document state together with the document and using the system resources on the user's local system suffers numerous defects. For instance, the number of prints can be changed and the local system clock can be reset. Thus, any replication for the initial document state, by duplicating the document and transferring it to other systems, for example, can be used to by pass the authorization process.

Furthermore, using an access device to record the document state and maintain initial resources, such as the clock, may also be undesirable. Though such access device could prevent tampering of the state and or making the document unique to a specific user, due to memory and speed limitations of an access device, this is not scalable in terms of the number of documents the end user may want to use and the length of time the state has to be kept within the access device.

In using documents, the end user may have a rendering application or an editing system. In order for an application to render/edit a document that is encrypted entirely, the end user must perform the decryption and then feed the document in clear to the application. This decrypt-and-then-use process opens a possibility for disclosing the document in clear after the decryption step to anyone who wants to intercept it. Thus, if the end user is able to obtain the clear document, any document authorization and protection is rendered useless.

This invention provides systems and methods for authorized document usage of protected documents during distribution and usage.

The various exemplary embodiments of the systems and methods of this invention combine public and non-commutative proxy encryption together with format preserved encryption and trusted rendering.

In the various exemplary embodiments of this invention, an end user performs cryptographic operations via an input device using an access device, for example.

In the various exemplary embodiments of the systems and methods of this invention, a document source or a third-party system trusted by the document source provides user authentication, usage authorization and document state tracking to a document processing device.

In the various exemplary embodiments of the systems and methods of this invention, access to protected documents is controlled by delegating the decryption from the document source to a document processing device. Accordingly, interactions between an input device and the document source are provided to generate public and non-commutative proxy keys. In these exemplary embodiments, the document processing device can use the proxy keys to convert the documents originally encrypted for the owner/publisher/distributor to ones encrypted for the end user.

In the various exemplary embodiments of the systems and methods of this invention, authorization and usage are combined by invoking a method of trusted rendering of documents. Thus, the proxy conversion and decryption are delayed to a late stage within the document rendering application.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
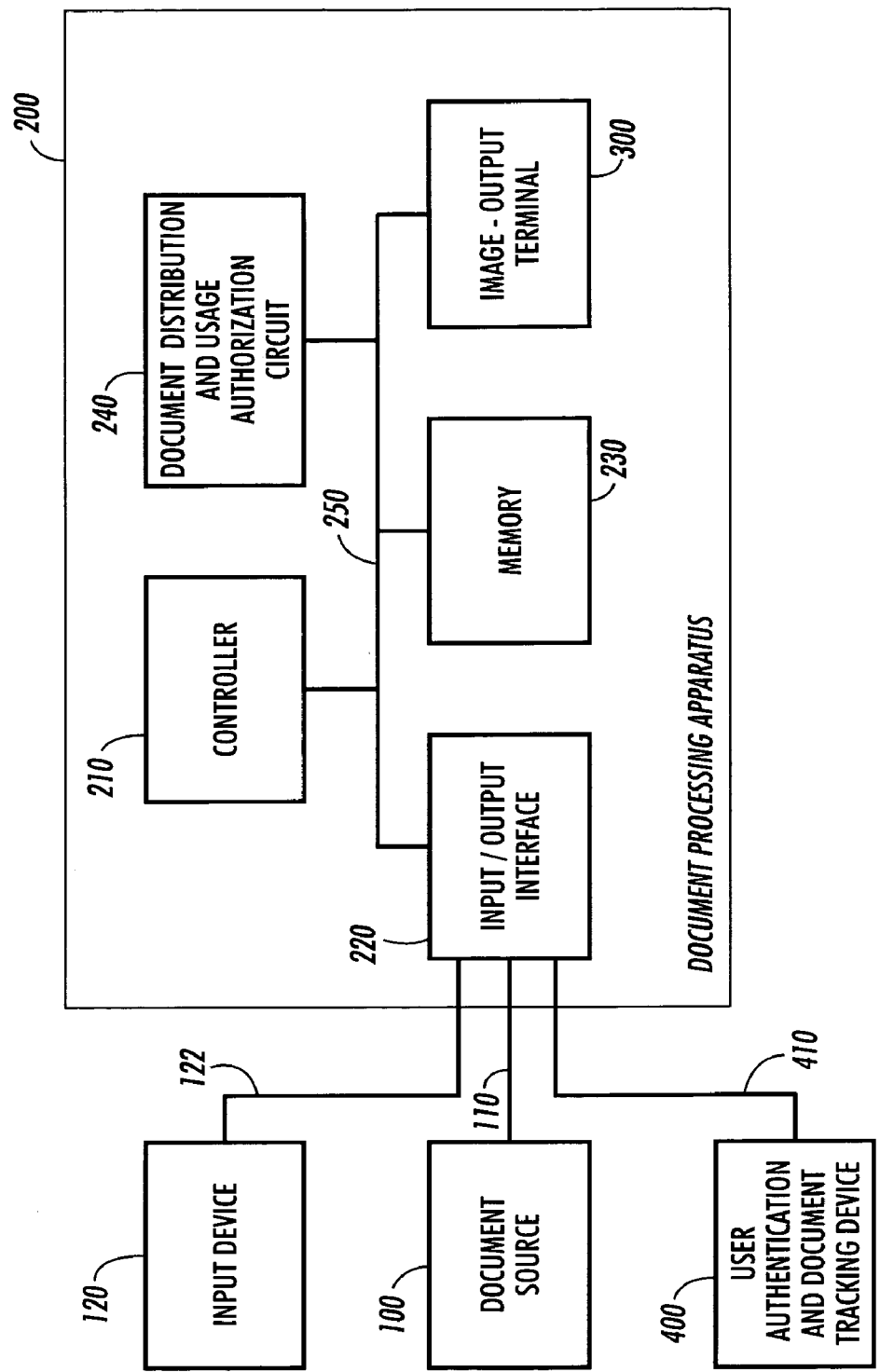
FIG. 1 is a block diagram of one exemplary embodiment of a document processing device according to this invention.

FIG. 1 shows one exemplary embodiment of a document processing device 200 incorporating document authorization in accordance with this invention. As shown in FIG. 1, a document source 100, an input device 120 and a user authentication and document tracking device 400 are connected to the document processing device 200 over links 110, 122 and 410, respectively.

The document source 100 can be a digital camera, a scanner, or a locally or remotely located computer, or any other known or later developed device that is capable of generating or otherwise providing protected electronic document. Similarly, the document source 100 can be any suitable device that stores and/or transmits protected electronic document, such as a client or a server of a network. The document source 100 can be integrated with the document processing device 200, or the document source 100 can be connected to the document processing device 200 over a connection device, such as a modem, a local area network, a wide area network, an intranet, the Internet, any other distributed processing network, or any other known or later developed connection device.

It should also be appreciated that, while the protected electronic document can be generated at the time of printing an image from electronic document, the protected electronic document could have been generated at any time in the past. Moreover, the protected electronic document need not have been generated from an original physical document, but could have been created from scratch electronically. The document source 100 is thus any known or later developed device which is capable of supplying protected electronic document over the link 110 to the document processing device 200. The link 110 can thus be any known or later developed system or device for transmitting the electronic document from the document source 100 to the document processing device 200.

The user authentication and document tracking device 400 can be any suitable device that authenticates a user and tracks a protected electronic document. The user authentication and document tracking device 400 can be integrated with the document processing device 200 or the document source 100, or the user authentication and document tracking device 400 can be connected to the document processing device 200 over a connection device, such as a modem, a local area network, a wide area network, an intranet, the Internet, any other distributed processing network, or any other known or later developed connection device. As with the link 110 described above, the link 410 can be any known or later developed device for transmitting control signals from the user authentication and document tracking device 400 to the document processing device 200.

The input device 120 can be any known or later developed device for providing control information from an end user to the document processing device 200. For example, the input device 120 can provide cryptographic operations from an end user's access device. Thus, the input device 120 can be a control panel of the document processing device 200, or could be a control program executing on a locally or remotely located general purpose computer, or the like. As with the link 110 described above, the link 122 can be any known or later developed device for transmitting control signals and data input using the input device 120 from the input device 120 to the document processing device 200.

As shown in FIG. 1, the document processing device 200 includes a controller 210, an input/output interface 220, a memory 230, a document distribution and usage authorization circuit 240, and an image output terminal 300, each of which is interconnected by a control and/or data bus 250. The links 110, 410 and 122 from the document source 100, the user authentication and document tracking device 400, and the input device 120, respectively, are connected to the input/output interface 220. The electronic document from the document source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The document processing device 200 shown in FIG. 1 is connected to the image output terminal 300 over the control and/or data bus 250. Alternatively, the image output terminal 300 may be an integral part of the document processing device 200. An example of this alternative configuration would be a digital copier or the like. It should be appreciated that the document processing device 200 can be any known or later developed type of document processing device. There is no restriction on the form the document processing device 200 can take.

The links 110, 410 and 122 can be any known or later developed device or system for connection, including a direct cable connection, a connection over a wide area network or a local area network, a connection over an intranet, a connection over the Internet, or a connection over any other distributed processing network or system. In general, the links 110, 410 and 122 can be any known or later developed connection system or structure usable for connection.

The memory 230 temporarily stores document, prior to processing, that has been input from the document source 100 into the document processing device 200. The document may be input from the document source 110 through the input/output interface 220, or, alternatively, may result from retrieving an image previously stored in the document processing device 200. The memory 230 stores appropriate information for transforming a document or a portion of the document.

The document distribution and usage authorization circuit 240 receives the protected document from the document source 100. The document distribution and usage authorization circuit 240 determines if an end user is an authorized user to access the document. The document distribution and usage authorization circuit 240 then and outputs the document to the image output terminal 300 over the control and/or data bus 250 based on the determination. That is, based on the document usage authorization made by the document distribution and usage authorization circuit 240, the document distribution and usage authorization circuit 240 controls the output of image signals to the image output terminal 300. Accordingly, when the output images are output to the image output terminal 300, the resulting image is accessible to an authorized end user.

While FIG. 1 shows the document distribution and usage authorization circuit 240 and the image output terminal 300 as portions of an integrated system, the document distribution and usage authorization circuit 240 could be provided as a separate device from the image output terminal 300. That is, the document distribution and usage authorization circuit 240 may be a separate device attachable upstream of a stand-alone image output terminal 300. For example, the document distribution and usage authorization circuit 240 may be a separate device which interfaces with both the document source 100 and the image output terminal 300.

Furthermore, the document distribution and usage authorization circuit 240 may be implemented as software on the document processing device 200 or the document source 100. Other configurations of the elements shown in FIG. 1 may be used without departing from the spirit and scope of this invention.

An end user who wishes to access a protected document is provided with an access device that is capable of storing a limited number of master keys and that can perform cryptographic operations. One exemplary embodiment of the access device is a smartcard which performs cryptographic operations. However, it should be appreciated that any device which is capable of storing a limited number of master keys and that can perform cryptographic operations may be used as the access device. The end user then inserts the access device to the input device 120.

The user authentication and document tracking device 400 provides user authentication and document state tracking, for example, to the document processing device 200. The user authentication and document tracking device 400 delegates decryption to the document distribution and usage authorization circuit 240 of the document processing device 200.

Via the input device 120, the access device interacts with the document source 100 to generate public and non-commutative proxy keys. The document distribution and usage authorization circuit 240 uses the proxy keys to convert the documents originally encrypted for the owner/distributor themselves to ones encrypted for the end user.

The document processing device 200 combines authorization and usage by invoking the method of trusted rendering of documents. That is, the proxy conversion and decryption are delayed to a late stage within the document rendering application. That is, the document processing device 200 integrates the ideas of the public and non-communicative proxy encryption, and the format preserving encryption and trusted rendering.

Each document provided by the document source 100 is encrypted under a publisher's key of an additive, public and non-commutative proxy encryption whose decryption key is known to the document source 100. The use of the proxy encryption allows the document source 100 to transfer the decryption right to authorized end users. The document and associated usage conditions and terms may be signed with the publisher's own signing key.

The protected document requires a trusted rendering application to render documents of the same form. Since documents with multimedia documents in particular are formatted messages and they rely on appropriate rendering applications to display, play, print and even edit them, it is important that only the rendered document contents, that is, document images on screen and in print at the image output terminal 300, are ultimately presented to the end user in order to increase the level of protection for the document and reduce the trust requirement on the application, the document is encrypted in a format-preserving manner and rendered in a trusted way. This application can be packaged with the protected document, or made as a separated application that is pre-installed on the document processing device 200.

The resulting protected document and possibly the rendering application are then transmitted to end users at the image output terminal 300, such as by putting it on an Internet file server or "web site" for download, or by pressing it onto a compact disk (CD), or by arranging for it to be broadcast via satellite or cable, or by any combination of these means.

Figure 2:
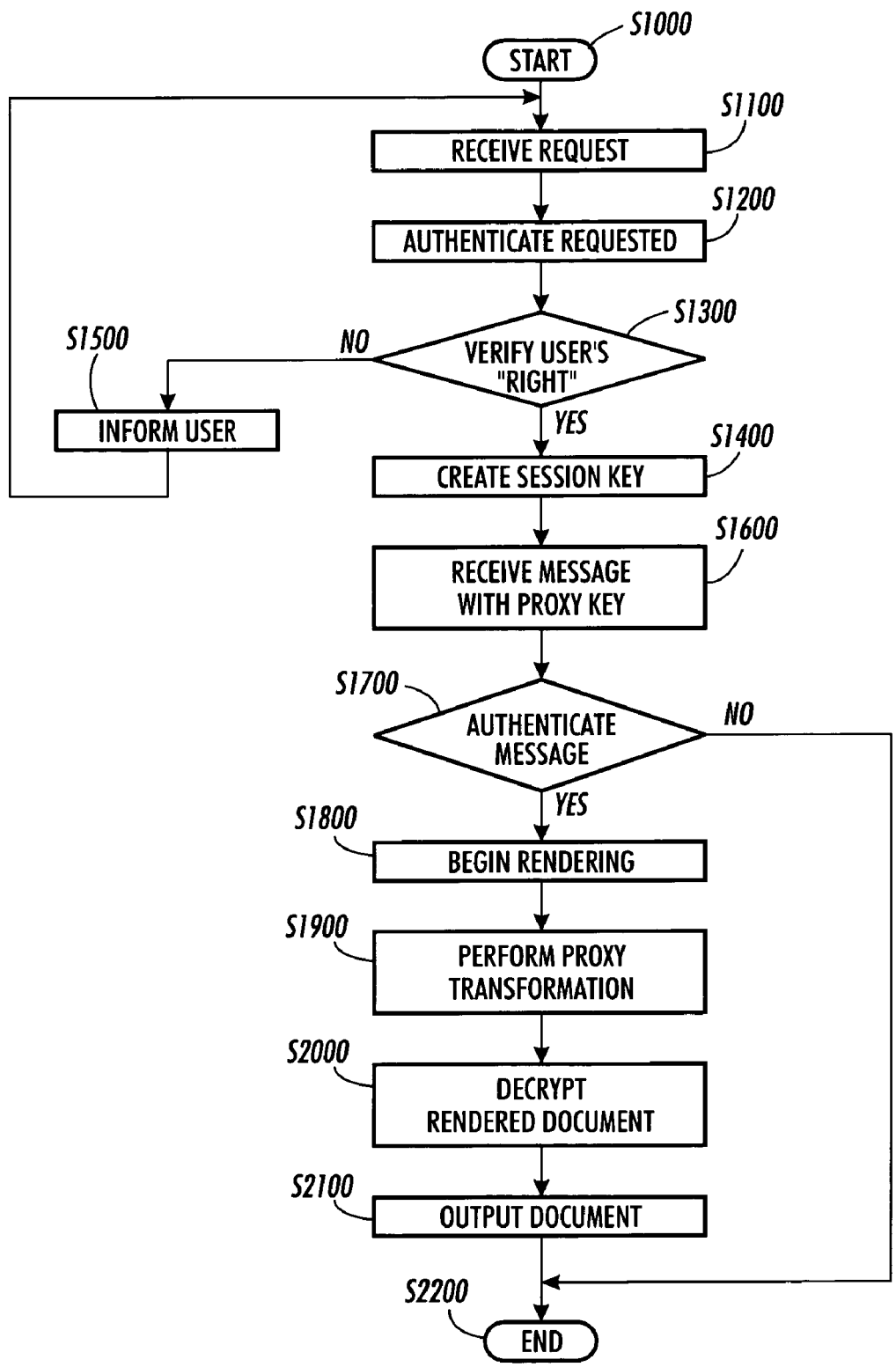
FIG. 2 is a flowchart outlining document processing method according to this invention.

FIG. 2 is a flowchart outlining a document processing method according to this invention. Beginning at step S1000, control continues to step S1100, where a document usage request is received. The request may contain document identification, usage type, the end user's public identity information, and the like. Then, in step S1200, the requested document is authenticated and terms and conditions of the access are notified. That is, the protected document is authenticated by checking a digital signature, for example, associated with the document, and verifying the integrity of each component of the document, and the terms and conditions are notified to the end user, before sending out the request. It should be appreciated that the terms and conditions may be obtained directly from the document, or if the document contains a reference to the information, the terms and conditions may be obtained from the reference location. The terms and conditions may also be obtained from a local or remote database. Accordingly, it should be appreciated that the information can be obtained from any source. Control then continues to step S1300.

In step S1300, the end user's "right" to use the document is verified by checking end user's credentials and possibly system resources, such as a system clock or IP address, against the terms and conditions. If the end user's right is verified, control continues to step S1400, key establishment is executed to create a session key. Else, if the end user's right is not verified, control skips to step S1500, where the end user is informed and control returns to step S1100. Control then continues to step S1600.

In step S1600, a public and non-commutative proxy key is received from the document source 100 packaged along with an authorization receipt in a signed message that will delegate the decryption right to the session. The public and non-commutative proxy key is obtained using the private, decryption key of the protected document, for example. Next, in step S1700, the authenticity of the message is verified. If the message is not authenticated, control skips to step S2200. In another alternative embodiment, in step S1700, if the message is not authenticated, control returns to step S1500, where the end user is informed. Otherwise, if the message is authenticated, control continues to step S1800, where rendering of the document under encryption begins. This is possible because an additive encryption scheme is used to encrypt the document in a format-preserving way. Control then continues to step S1900.

In step S1900, proxy transformation is performed on the partially rendered document using the proxy key. Then, in step S2000, the document is decrypted using the session key. Next, in step S2100, the rendered document image is output. Control then continues to step S2200 where the control sequence ends.

Thus, the decryption is transferred right from the document source to the document processing device as controlled from an access device, for example, at the input device. It is important that the session and proxy keys can not be used directly to decrypt the encrypted document without going through the rendering process. Moreover, these keys are session dependent, and it is not necessary to store them in some persistent memory on the access device to be inserted into the input device and the document source.

In particular, the authorized usage according to one exemplary embodiment of the methods and systems of this invention is as follows:

1. The end user initializes a document usage request to the document processing device. The request contains the document identification, usage type, and the end user's public identity information. The document processing device authenticates the protected document by checking the digital signature associated with the document, verifies the integrity of each component of the document, and notifies the abstract and the terms and conditions to the end user, before sending out the request to the document source.

2. A document source retrieves terms and conditions associated with the document identification and the usage type. For example, if the document contains the information, the document source obtains the information from the document processing device. If the document contains a reference to the information, the document source can obtain the information from the reference location. The document source can also look up the information from a local or remote database.

3. The document source queries the end user to supply necessary credentials and other required usage parameters, and queries the document processing apparatus for necessary system resource information.

4. The document source verifies the end user's "right" to use the document, by checking end user's credentials and system resources against the terms and conditions.

5. If the end user's right is verified, the document source stores in the end user's account that the end user has been authorized. Optionally, the document source verifies if the end user is willing to accept the associated financial charge via a credit card account or "e-cash". If the end user's right is not verified, the document source informs the end user with a proper message that provides the end user several options such as to obtain/purchase credentials and to simply abort the usage request.

6. The document source and an access device execute key establishment to create a session key. Alternatively, the end user's public key may be used instead.

7. The document source uses the private, decryption key of the protected document to issue a public and non-commutative proxy key that will delegate the decryption right to the session.

8. The document source "packages" the proxy key along with an authorization "receipt" into a signed message, and sends it to the document processing device.

9. The document processing device passes the information contained in the message to the access device at the input device. The input device verifies the authenticity of the message. If the message is authenticated, the input device instructs the document processing device to start rendering the document under encryption, or otherwise abort the process.

10. The document processing device renders the protected document in the trusted manner. This is possible because an additive encryption scheme is used to encrypt the document in a format-preserving way.

11. The document processing device performs the proxy transformation on the partially rendered document using the proxy key and subsequently decrypts the document using the session key.

12. The input device releases the proxy key and session key to the document processing device when the document processing device is ready to decrypt the partially rendered document. Alternatively, the keys are released only, and then, an authorization device-aided decryption is run with the document processing device to decrypt the document after the proxy transformation.

13. The document processing device outputs the rendered document image to image output terminal such as a screen, or a printer.

Figure 3:
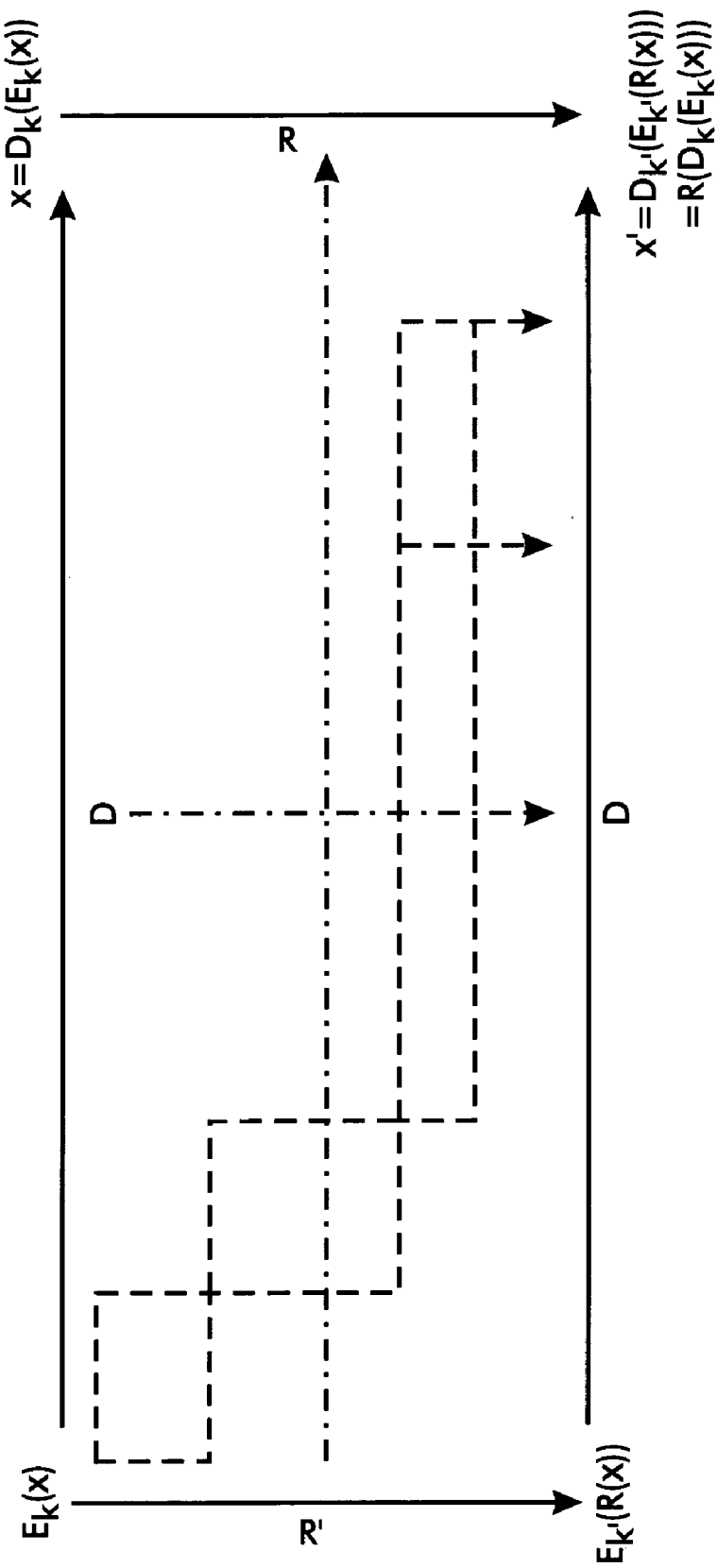
FIG. 3 shows one exemplary embodiment of the trusted rendering of the methods and systems of this invention.

FIG. 3 shows one exemplary embodiment of the trusted rendering of the methods and systems of this invention. As shown in FIG. 3, the document protection yielded in accordance with the various exemplary embodiments of the systems and methods of this invention relies on the end user's inability to capture a useful form of the document at any intermediate stage during the rendering process. As shown in FIG. 3, k and k' are cryptographic keys.

To protect the document, the following sequence of transformations is commonly used:

$$y=E(x)$$

followed by $$x=D(y),$$

and then $$x'=R(x)$$

where
  x denotes the clear document,
  y denotes the encrypted document,
  x' denotes the rendered document
  E denotes the encryption function,
  D denotes the decryption function, and
  R denotes the rendering transformation.

Early decryption may leave the document in a vulnerable state. Preferably, the transformations after the encryption y=E(x) are performed in the reverse order, that is, R(E(x)) followed by D(R(E(x))). This postpones decryption to the latest possible time.

The existence of a rendering operation R' that can be performed before decryption, is determined by the following equality:

$$D(R'(E(x)))=R(D(E(x)))$$

In case that the encryption and decryption functions are commutative, that is, E(D(x))=D(E(x)) for any x, the existence of the rendering operation R' is ensured:

$$R'(y)=E(R(D(y))), \text{ for } y=E(x)$$

In practice, encryption and decryption in popular public-key cryptographic systems satisfy the commutation requirement. This means that the rendering operation R' exists if these cryptographic systems or the proxy encryption derived from these systems are used for encryption and decryption.

The rendering operation R' that corresponds to the rendering transformation R can be determined efficiently, and in particular, an invocation of the decryption function D is necessary during an implementation of the rendering operation R'. The rendering operation R' can be implemented efficiently where the rendering transformation R is commutative with the encryption function E. When this happens, $$R'(y)=E(R(D(y)))=R(E(D(y)))=R(y) \text{ for } y=E(x).$$

In this case, the rendering operation R' is equal to the rendering transformation R.

Document protection may exist on the document processing device between the two extremes, i.e., $x'=R(D(E(x)))$, which has no protection on $x=D(E(x))$, and $x'=D(R(E(x)))$, which has ideal protection. As shown in FIG. 3, different paths from the encrypted document $E(x)$ to the presentation data x' may be considered that correspond to different combinations of partial rendering transformations and partial description transformations. It should be appreciated that delaying the decryption D in any path increases the protection level to the document.

Unlike a simple application of an encryption scheme to a document which results in encrypting the entire document, only a portion of a document, such as image tokens, content and/or their positions, layout and the like, is encrypted, so that the encrypted document is still in its valid format and can be rendered directly but possibly with the contents scrambled and positions misplaced. This makes it possible to perform document decryption in a late stage of the rendering process and provide further protection on the document even during the rendering process. The deferral of decryption is achieved by using additive encryption schemes to encrypt position information and one-way hash functions to protect image tokens.

The document processing device 200 shown in FIG. 1 is preferably implemented on a programmable general purpose computer. However, the document processing device 200 shown in FIG. 1 can also be implemented on a special purpose computer, a programmable microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 2, can be used to implement the document processing device 200.

In particular, it should be understood that each of the circuits shown in FIG. 1 can be implemented as portions of a suitably programmable general purpose computer. Alternatively, each of the circuits shown in FIG. 1 can be implemented as physically distinct hardware circuits within an ASIC, or using a FPGA, a PDL, a PLA or a PAL, or using discrete logic elements or discrete circuit elements. The particular form each of the circuits shown in FIG. 1 will take is a design choice and will be obvious and predicable to those skilled in the art.

The memory 230 is preferably implemented using static or dynamic RAM. However, the memory 230 can also be implemented using a floppy disk and disk drive, a writable optical disk and disk drive, a hard drive, flash memory or any other known or later developed alterable volatile or non-volatile memory device or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for using a partially encrypted document, comprising:
    issuing a document usage request for using the partially encrypted document in a session;
    authenticating the partially encrypted document;
    receiving authorization to use the partially encrypted document;
    receiving a session key for the session;
    receiving a proxy key that delegates decryption to the session;
    rendering a non-encrypted portion of the partially encrypted document;
    performing a proxy transformation on the partially rendered, partially encrypted document using the proxy key,
    wherein rendering a portion of the partially encrypted document and performing proxy transformation on the rendered portion of the partially encrypted document comprises a combination of performing partial rendering transformations and performing partial decryption transformations; and
    decrypting the proxy transformed, partially rendered, partially encrypted document using the session key,
    wherein the proxy key and the session key are used to decrypt the partially encrypted document as part of the session rendering process only, thereby assuring that only rendered images of the decrypted document are available to an end user.

2. The method for using a partially encrypted document claim 1, further comprising:
    retrieving terms and conditions of the session;
    retrieving usage parameters and system resource information for the session; and
    comparing the retrieved usage parameters and system resources and the retrieved terms and conditions, wherein the authorized usage is based on comparison results of the retrieved usage parameters and system resources and the retrieved terms and conditions.

3. The method for using a partially encrypted document of claim 2, wherein the retrieved terms and conditions are associated with at least one of identification of the partially encrypted document and usage type.

4. The method for using a partially encrypted document of claim 1, wherein the document usage request contains at least one of document identification, usage type, and user identification.

5. The method for using a partially encryted document of claim 1, wherein authenticating the partially encryted document comprises at least one of:
    checking a digital signature associated with the Previously Amended document; and
    verifying integrity of each component of the Previously Amended document.

6. A usage authorization system for using a partially encrypted document, comprising:
    a request receiving device that receives a document usage request for using the partially encrypted document in a session;
    a document processing device that authenticates the partially encrypted document, wherein the document processing device authenticates the partially encrypted document by at least one of checking a digital signature associated with the partially encrypted document, and verifying integrity of each component of the partially encrypted document;

a document source that authorizes usage of the partially encrypted document, and issues a proxy key that delegates decryption to the session;

an access device that, along with the document device, creates a session key for the session, wherein the document processing device renders the partially encrypted document, performs proxy transformation on the rendered, partially encrypted document using the proxy keys, and decrypts the proxy transformed rendered partially encrypted document using the session key, wherein the proxy key and the session key are used to decrypt the partially encrypted document as part of the session rendering process only, thereby assuring that only rendered images of the decrypted document are available to an end user.

7. The usage authorization system for using a partially encrypted document of claim 6, wherein the document source retrieves terms and conditions of the session, retrieves usage parameters and system resource information for the session, and compares the retrieved usage parameters and system resources and the retrieved terms and conditions, the authorized usage being based on comparison results of the retrieved usage parameters and system resources and the retrieved terms and conditions.

8. The usage authorization system for using a partially encrypted document of claim 7, wherein the retrieved terms and conditions are associated with at least one of identification of the partially encrypted document and usage type.

9. The usage authorization system for using a partially encrypted document of claim 6, wherein the document usage request contains at least one of document identification, usage type, and user identification.

10. The method for using a partially encrypted document of claim 1, wherein the session and proxy keys are not usable for directly decrypting the partially encrypted document without rendering the portion of the partially encrypted document and performing proxy transformation on the rendered portion of the document.

11. A method for using a partially encrypted document, comprising:

receiving a document usage request for using the partially encrypted document in a session;

authorizing use the partially encrypted document;

creating a session key for the session; and issuing a proxy key that delegates decryption to the session, wherein the proxy key and the session key enable:

rendering a non-encrypted portion of the partially encrypted document;

performing a proxy transformation on the partially rendered, partially encrypted document using the proxy key, wherein rendering a portion of the partially encrypted document and performing proxy transformation on the rendered portion of the partially encrypted document comprises a combination of performing partial rendering transformations and performing partial decryption transformations; and decrypting the proxy transformed, partially rendered, partially encrypted document using the session key, wherein the proxy key and the session key are used to decrypt the partially encrypted document as part of the session rendering process only, thereby assuring that only rendered images of the decrypted document are available to an end user.

* * * * *